(12) United States Patent
Saksena et al.

(10) Patent No.: US 9,699,319 B2
(45) Date of Patent: Jul. 4, 2017

(54) EXECUTING, AT LOCAL NODES, CENTRALLY PROVISIONED TELEPHONY SERVICES

(75) Inventors: Vikram Saksena, Acton, MA (US); Michael G. Hluchyj, Wellesley, MA (US); Umamaheswar Reddy, Marlborough, MA (US)

(73) Assignee: SONUS NETWORKS, INC., Westford, MA (US)

( * ) Notice: Subject to any disclaimer, the term of this patent is extended or adjusted under 35 U.S.C. 154(b) by 1518 days.

(21) Appl. No.: 11/301,350

(22) Filed: Dec. 9, 2005

(65) Prior Publication Data

US 2006/0153168 A1  Jul. 13, 2006

Related U.S. Application Data

(60) Provisional application No. 60/634,882, filed on Dec. 10, 2004.

(51) Int. Cl.

| | |
|---|---|
| H04L 12/66 | (2006.01) |
| H04M 11/00 | (2006.01) |
| H04W 60/00 | (2009.01) |
| H04M 7/00 | (2006.01) |
| H04L 29/06 | (2006.01) |
| H04M 3/493 | (2006.01) |

(52) U.S. Cl.
CPC .... H04M 7/0012 (2013.01); H04L 29/06027 (2013.01); H04L 65/1006 (2013.01); H04L 65/1069 (2013.01); H04L 65/1083 (2013.01); H04L 65/1096 (2013.01); H04L 65/4007 (2013.01); H04M 3/4938 (2013.01)

(58) Field of Classification Search
CPC ............ H04L 65/1069; H04L 65/1006; H04M 2203/2011
USPC .......................................... 370/352; 709/206
See application file for complete search history.

(56) References Cited

U.S. PATENT DOCUMENTS

| | | | | |
|---|---|---|---|---|
| 5,463,682 A | * | 10/1995 | Fisher ............... | H04M 3/42144 379/201.03 |
| 6,219,413 B1 | * | 4/2001 | Burg ......................... | 379/215.01 |
| 6,766,168 B1 | * | 7/2004 | Lim ........................... | 455/435.1 |

(Continued)

FOREIGN PATENT DOCUMENTS

| | | | | |
|---|---|---|---|---|
| EP | 1343287 A2 | 9/2003 | ............. | H04L 26/06 |
| JP | 2003535506 | 11/2003 | | |

(Continued)

OTHER PUBLICATIONS

Bakker, John-Luc, and Jain, Ravi "Next Generation Service Creation Using XML Scripting Languages," IEEE International Conference on Communications, vol. 4, Apr. 28-May 2, 2002, pp. 2001-2007.

(Continued)

*Primary Examiner* — Parth Patel
*Assistant Examiner* — Jason Harley
(74) *Attorney, Agent, or Firm* — Stephen T. Straub; Ronald P. Straub; Michael P. Straub

(57) ABSTRACT

Described are methods, systems, and apparatus, including computer program products for executing, at local nodes, centrally provisioned telephony services. A telephony service can be provisioned at a central node. The telephony service is transmitted to a first local node. The telephony service is executed at the first local node.

28 Claims, 7 Drawing Sheets

(56) References Cited

U.S. PATENT DOCUMENTS

| | | | |
|---|---|---|---|
| 6,925,076 B1* | 8/2005 | Dalgic et al. | 370/356 |
| 7,603,433 B1* | 10/2009 | Paterik | 709/217 |
| 2002/0120746 A1* | 8/2002 | Patil et al. | 709/227 |
| 2002/0126820 A1* | 9/2002 | Barak | H04M 3/38 379/219 |
| 2002/0169776 A1 | 11/2002 | Tuunanen et al. | 707/9 |
| 2003/0169730 A1* | 9/2003 | Narasimhan | H04L 12/2856 370/355 |
| 2004/0008665 A1* | 1/2004 | Johnson | H04L 12/2859 370/352 |
| 2004/0111521 A1 | 6/2004 | Igarashi et al. | |
| 2004/0264444 A1* | 12/2004 | Kaplan et al. | 370/352 |
| 2005/0249190 A1* | 11/2005 | Birch | H04Q 3/0029 370/352 |
| 2006/0153168 A1* | 7/2006 | Saksena | H04L 29/06027 370/352 |

FOREIGN PATENT DOCUMENTS

| | | |
|---|---|---|
| JP | 2004507949 | 3/2004 |
| JP | 2004172782 | 6/2004 |
| WO | WO 01/93523 | 12/2001 |
| WO | WO 02/19732 | 3/2002 |

OTHER PUBLICATIONS

"Voice Extensible Markup Language (Voice XML) 2.1," *W3C*, Jun. 13, 2005.

"Voice Browser Call Control: CCXML Version 1.0," *W3C*, Jun. 29, 2005.

Notification of Transmittal of the International Search Report and the Written Opinion of the International Searching Authority, or the Declaration for PCT/US2005/044809, Apr. 21, 2006.

International Search Report for PCT Application No. PCT/US2005/044809 mailed on Apr. 21, 2006 (4 pgs).

The Written Opinion of the International Searching Authority for PCT Application No. PCT/US2005/044809 (8 pgs).

"Advanced Service Delivery and Control—Enhanced Service Customization"; CopperCom™, app notes 5-24.a; Jun. 11, 2004; pp. 3 & 4.

\* cited by examiner

EXECUTING, AT LOCAL NODES, CENTRALLY PROVISIONED TELEPHONY SERVICES

CROSS REFERENCES TO RELATED APPLICATIONS

This application claims the benefit of U.S. Provisional Application No. 60/634,882, filed on Dec. 10, 2004, the disclosure of which is hereby incorporated herein by reference.

FIELD OF THE INVENTION

The present invention relates generally to computer-based methods and apparatuses, including computer program products, for executing, at local nodes, centrally provisioned telephony services.

BACKGROUND

The proliferation of packet-based networks has recently led to an emerging alternative to traditional circuit-based telephony networks. Specifically, packet-based networks, such as an Internet Protocol (IP) network, have provided for the ability to packetize and transmit data content of telephony communications (e.g., voice or videoconferencing data). Such a configuration is commonly referred to as a Voice over Internet Protocol (VOIP) network and can support voice, data, and video content. A VOIP network employs packet-switches (also referred to as gateways, media gateways, media gateway controllers, switching components, softswitches, data sources, or call processors).

To support and enhance voice communications, VOIP networks have provided telephony services, such as dialog interaction with the user. Typically, there are two approaches to provisioning and executing telephony services on a network. The first approach requires the centralization of both provisioning and executing the telephony service at a central server. The centralization of both the provisioning and execution of the telephony service allows for mobility of subscribing users, because the server can be accessed from anywhere. The second approach requires the distribution of both provisioning and executing the telephony service at local servers. The distribution of both the provisioning and execution of the telephony service allows for scalability of subscribing users, because local servers can easily be added as networks grow.

SUMMARY OF THE INVENTION

One approach to provisioning and executing telephony services is to centrally provision a telephony service and locally execute the telephony service. In one aspect, there is a method. The method involves provisioning a telephony service at a central node, transmitting at least a portion of the telephony service to a first local node, and executing at least an executable portion of the telephony service at the first local node.

In another aspect, there is a system. The system comprises a central node adapted to store a provisioned telephony service and to transmit the telephony service to a first local node, the first local node adapted to execute the telephony service.

In another aspect, there is a system. The system comprises a local node adapted to execute a telephony service and to receive the telephony service transmitted to the local node from a central node, the central node adapted to store the telephony service prior to transmitting to the local node.

In another aspect, there is a computer program product. The computer program product is tangibly embodied in an information carrier, the computer program product including instructions being operable to cause a data processing apparatus to store a provisioned telephony service at a central node, and to transmit the telephony service to a first local node, the first local node adapted to execute the telephony service.

In another aspect, there is a computer program product. The computer program product is tangibly embodied in an information carrier, the computer program product including instructions being operable to cause a data processing apparatus to receive a telephony service transmitted from a central node, the central node adapted to store a telephony service, and to execute the telephony service.

In other examples, any of the aspects above can include one or more of the following features. The central node can include a server. The first local node can include a services gateway. The telephony service can include a set of instructions. The set of instructions can conform to a CCXML standard. The set of instructions can support a voice telephony service based on: VXML, MSCML, MSML, MOML, IVR, or any combination thereof. The telephony service can include a SIP address. The SIP address can represent a called party.

In some embodiments, a user is associated with the first local node. The first local node can be in communication with a telephony device of the user. The telephony device can include an IP phone and/or a wireless phone. The telephony service can be stored at the central node and can include a telephony service template. The executable portion of the telephony service can be generated using the telephony service template. The transmitted portion of the telephony service can include the telephony service template. The transmitted portion of the telephony service can include the executable portion of the telephony service generated using the telephony service template. The user can be associated with the first local node in response to the telephony device of the user connecting with a local network coupled to the first local node. The user can be associated with the first local node in response to the user registering the telephony device with the first local node. The telephony service can be transmitted to the first local node in response to associating the user with the first local node. The telephony service can be transmitted to the first local node in response to a call associated with the user. The user can be associated with a second local node different from the first local node. The telephony service can be transmitted to and executed at the second local node. The user can be associated with the second local node in response to the telephony device of the user connecting with a local network coupled to the second local node. The user can be associated with the second local node in response to the user registering the telephony device with the second local node.

Any of the above implementations can realize one or more of the following advantages. Provisioning telephony services at a central node allows for users to be mobile, because they are able to centrally access their telephony services independent of their location. In addition, executing the telephony services at a local node advantageously allows for the scalability of telephony networks, because local nodes can easily be added as user numbers increase. In addition, provisioning telephony services at a central node and executing the telephony services at a local node advantageously allows for the optimization of each node more efficiently, because the function of provisioning depends more on database management resources, while the function of execution depends more on computing processing resources.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

DETAILED DESCRIPTION

In VOIP networks, telephony services can serve multiple functions (e.g. call control, dialog control, database access, and/or other telephony service functions). Telephony service call control can include controlling a call setup between two or more parties, or between a party and a server to access a database. Call control can be implemented using a set of instructions based on, for example, the Call Control eXtensible Markup Language (CCXML). Telephony services can also provide for dialog control for voice interaction between a user and a database. Dialog control can be implemented using a set of instructions based on, for example, the Voice eXtensible Markup Language (VXML), Media Server Control Markup Language (MSCML), Media Server Markup Language (MSML), Media Object Markup Language (MOML), Interactive Voice Response (IVR), and/or other network media languages. Telephony services can also include ECMA-based scripts for performing additional functions, e.g., computation of data needed by the telephony service. In addition, telephony services can also provide users access to a remote database, in which the user can retrieve and/or update information, e.g., personal address books, personal dialing plans, personal assistants, contact lists, department information, and/or the like.

Figure 1:
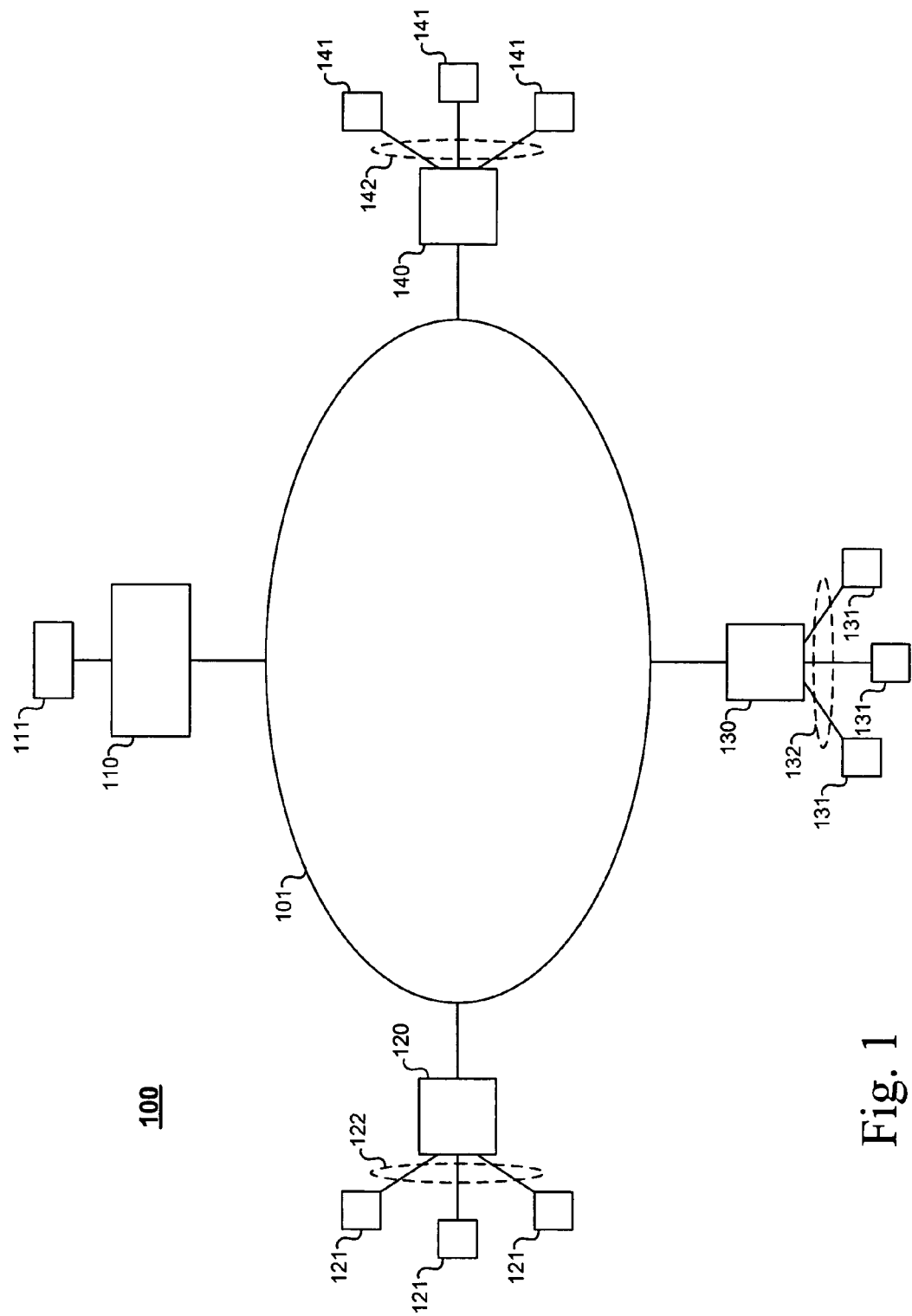
FIG. 1 is a block diagram showing an exemplary network with devices related to provisioning and executing telephony services.

The implementation of telephony services can be made more efficient when the execution of the telephony services occurs at a node separate from the node at which the telephony services are provisioned. FIG. 1 illustrates an exemplary network 100 with devices relating to the provisioning and execution of telephony services. The network 100 includes a packet-based network 101, e.g., the Internet, a carrier IP network, a private IP network, and/or the like. Coupled to the network 101 are a central node 110, and one or more local nodes, e.g., local nodes 120, 130, and 140). Telephony services can be provisioned at the central node 110, which can be, for example, a central server. Connected to the central node 110 is a service creation environment (SCE) 111, wherein telephony services are created. In this embodiment, the SCE 111 is connected to the central node 110, but other configurations can also be used. For example, the SCE 111 can be included in the central node 110 or the SCE 111 can be located remotely on the network 101. Telephony services can be executed at the local nodes 120, 130, and 140, which can be, for example, services gateways, local servers, or mobile switching centers. The local nodes 120, 130, and 140 can be coupled, respectively, to a plurality of user devices 121, 131, and 141. The user devices 121, 131, and 141 can be IP phones, wireless phones, and/or other telephony devices. The user devices 121, 131, and 141 can either be directly connected, respectively, to the local nodes 120, 130, and 140 or can be coupled to the local nodes 120, 130, and 140 via networks 122, 132, and 142. The networks 122, 132, and 142 can be IP networks (LAN or WAN), Private Branch eXchanges (PBXs) (Legacy or IP), and/or wireless networks in the case of wireless phones. The networks 122, 132, and 142 can also be the Public Switched Telephone Network (PSTN), wherein the local nodes 120, 130, and 140 can also include a PSTN gateway.

Figure 2:
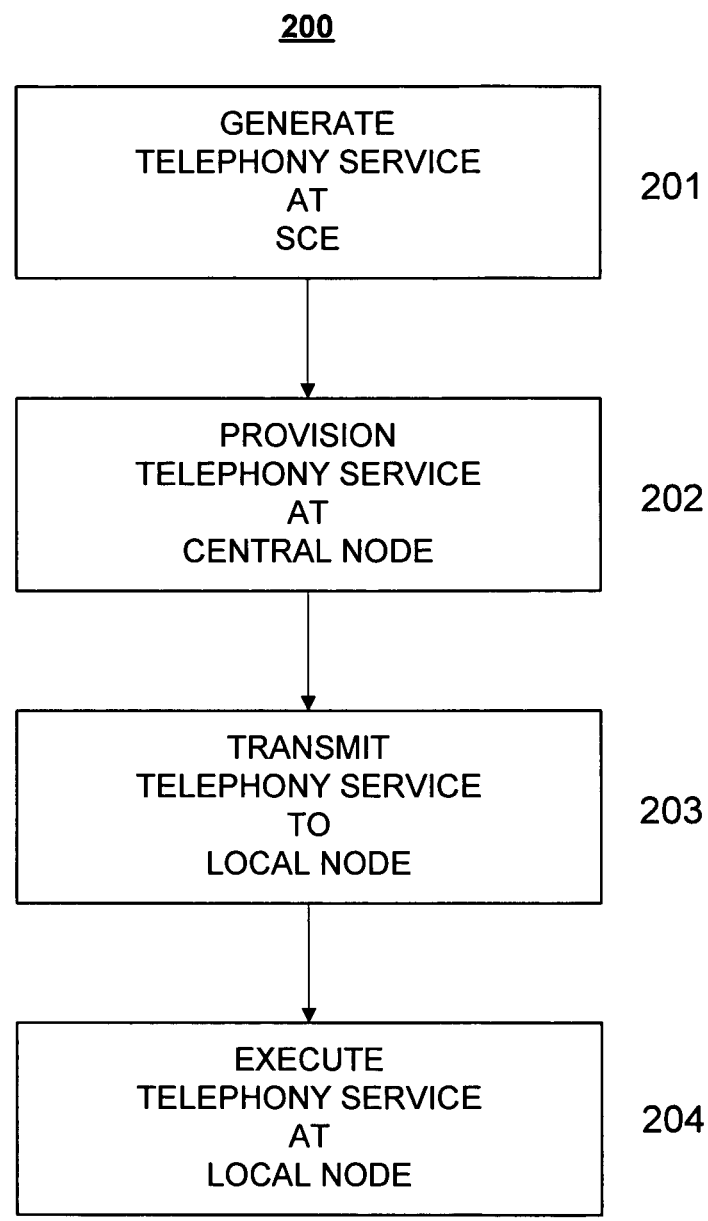
FIG. 2 is a flowchart depicting the creation, provisioning, transmission, and execution of a telephony service.

FIG. 2 illustrates a flowchart 200 depicting the creation, provisioning, transmission, and execution of a telephony service. The elements of the flowchart 200 are described using the exemplary network 100 of FIG. 1. A telephony service is generated at the SCE 111 (201). The telephony service can be an executable telephony service and/or a template telephony service. The telephony service is provisioned at the central node 110 by the SCE 111 for storage until the telephony service is required (202). The telephony service is transmitted to one or more of the local nodes, e.g., the local node 120, at predetermined times or when requested (203). Transmitting the telephony service to the local node 120 can be in response, for example, to one of the users 121 registering with the local node 120. Registration can automatically occur when the user's IP phone 121 is connected to the local network 122, or when the user's wireless phone 121 enters the wireless network 122. Transmission of the telephony service can also occur in response to a call initiated by one of the users 121. The executable portion of the telephony service is executed at the local node 120 (204). If the telephony service includes a template telephony service, the template telephony service can be used to generate an executable telephony service. The template telephony service can be associated with one of the users 121 or a group of the users 121. Groups of users can be, for example, all subscribers of a particular subscription plan of a service provider. Generating the executable telephony service can be based on the template telephony service and/or subscriber data associated with one of the users 121 and/or the group of users 121. Generating the executable telephony service can occur at the central node 110 before the transmission process 303 or at the local node 120 after the transmission process 303.

Figure 3:
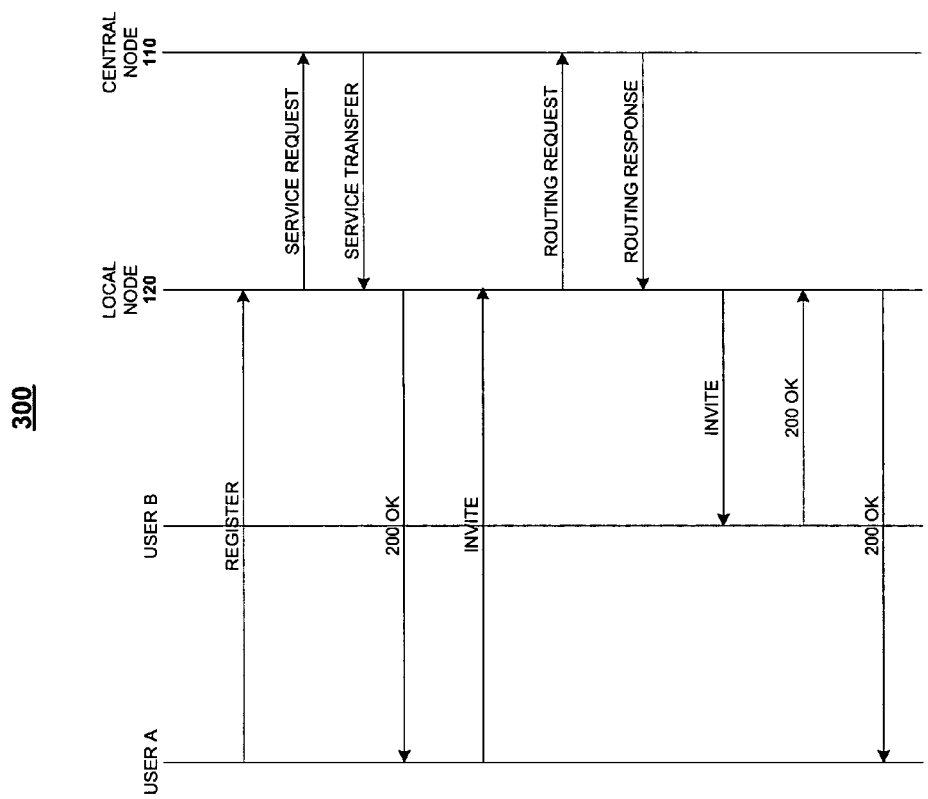
FIG. 3 illustrates a call flow diagram depicting the provisioning and execution of a telephony service when a user makes a call.

FIG. 3 illustrates a call flow 300 for setting up a call between two users, wherein the telephony service is transferred to the local node 120 prior to a call. The elements of the call flow 300 are described using the exemplary network 100 of FIG. 1. The ladder diagram begins when User A sends a register message to the local node 120. Registration can occur, for example, when User A initially connects to the network 122 associated with the local node 120. The local node 120 receives the register message and determines if a local storage (not shown) connected to the local node 120 contains the telephony services associated with User A. For example, the telephony services may have previously been retrieved from the central node 110 from a prior registration request by User A. If the telephony services are associated with a group of users, of which User A is a member of, the telephony services may have previously been retrieved from the central node 110 from a prior registration request from any of the users of the group. If the local storage of the local node 120 does not contain the telephony services, or if the locally stored telephony services are out-of-date, the local node 120 sends a service request message to the central node 110. The central node 110 transfers the telephony service to the local node 120. The local node 120 can send an acknowledgement of receipt to User A to signal a successful registration. To initiate a call to User B, User A sends an INVITE message to the local node 120. The INVITE message can be based on a signaling protocol such as the session initiation protocol (SIP), the H.323 protocol, or the like. Upon receipt of the INVITE message, the local node 120 locally retrieves the telephony service (e.g., retrieves the telephony service from the local storage) and executes the telephony service associated with User A. In this example, the telephony service controls the call setup with User B, which can require retrieving routing information associated with User B. If the local node 120 does not have the routing information associated with User B locally stored, the local node 120 requests the routing information from the central node 110. Using the retrieved routing information, the local node 120 sends an INVITE message to User B. User B can respond to the local node 120 to indicate successful receipt of the INVITE message. The local node 120 sends a message to User A indicating successful receipt by User B of the INVITE message and that the communication with User B is ready to commence.

Figure 4:
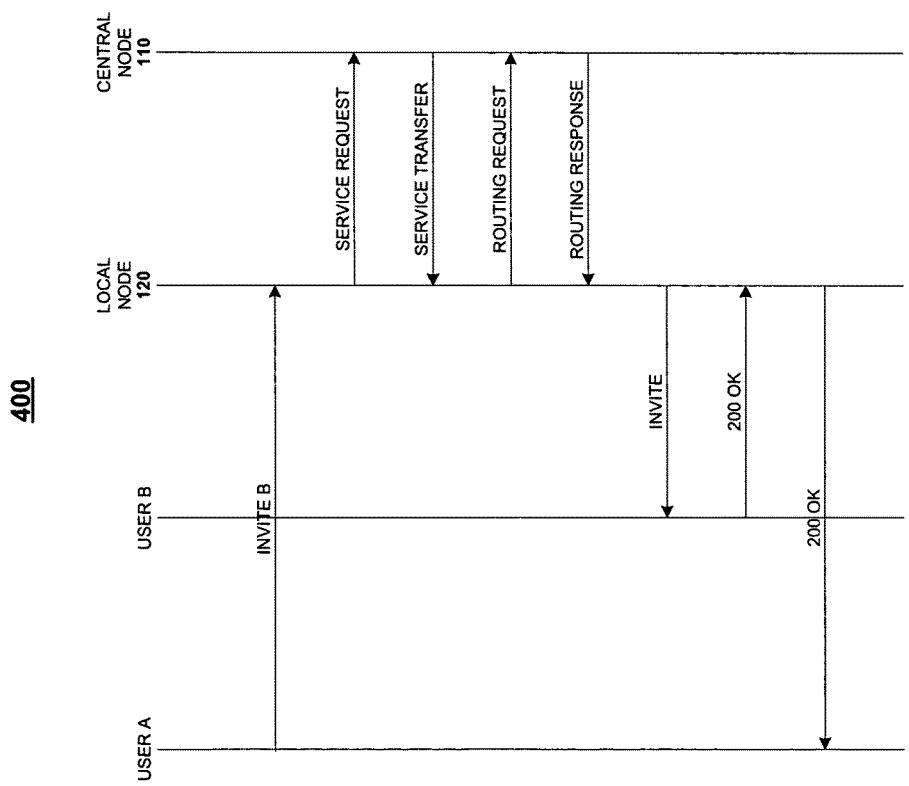
FIG. 4 illustrates another call flow diagram depicting the provisioning and execution of a telephony service when a user makes a call.

FIG. 4 illustrates a call flow 400 for setting up a call between two users, wherein the telephony service is transferred to the local node 120 at the time of the call request. The elements of the call flow 400 are described using the exemplary network 100 of FIG. 1. The ladder diagram begins when User A sends an INVITE message to the local node 120. Upon receipt of the INVITE message, the local node 120 determines if a local storage (not shown) connected to the local node 120 contains the telephony service associated with User A. If the local storage of the local node 120 does not contain the telephony services, or if the locally stored telephony services are out-of-date, the local node 120 sends a service request message to the central node 110. The central node 110 transfers the telephony service to the local node 120. The local node 120 executes the telephony service associated with User A. In this example, the telephony service controls the call setup with User B, which can require retrieving routing information associated with User B. If the local node 120 does not have the routing information associated with User B locally stored, the local node 120 requests the routing information from the central node 110. Using the retrieved routing information, the local node 120 sends an INVITE message to User B. User B can respond to the local node 120 to indicate successful receipt of the INVITE message. The local node 120 sends a message to User A indicating successful receipt by User B of the INVITE message and that the communication with User B is ready to commence.

Figure 5:
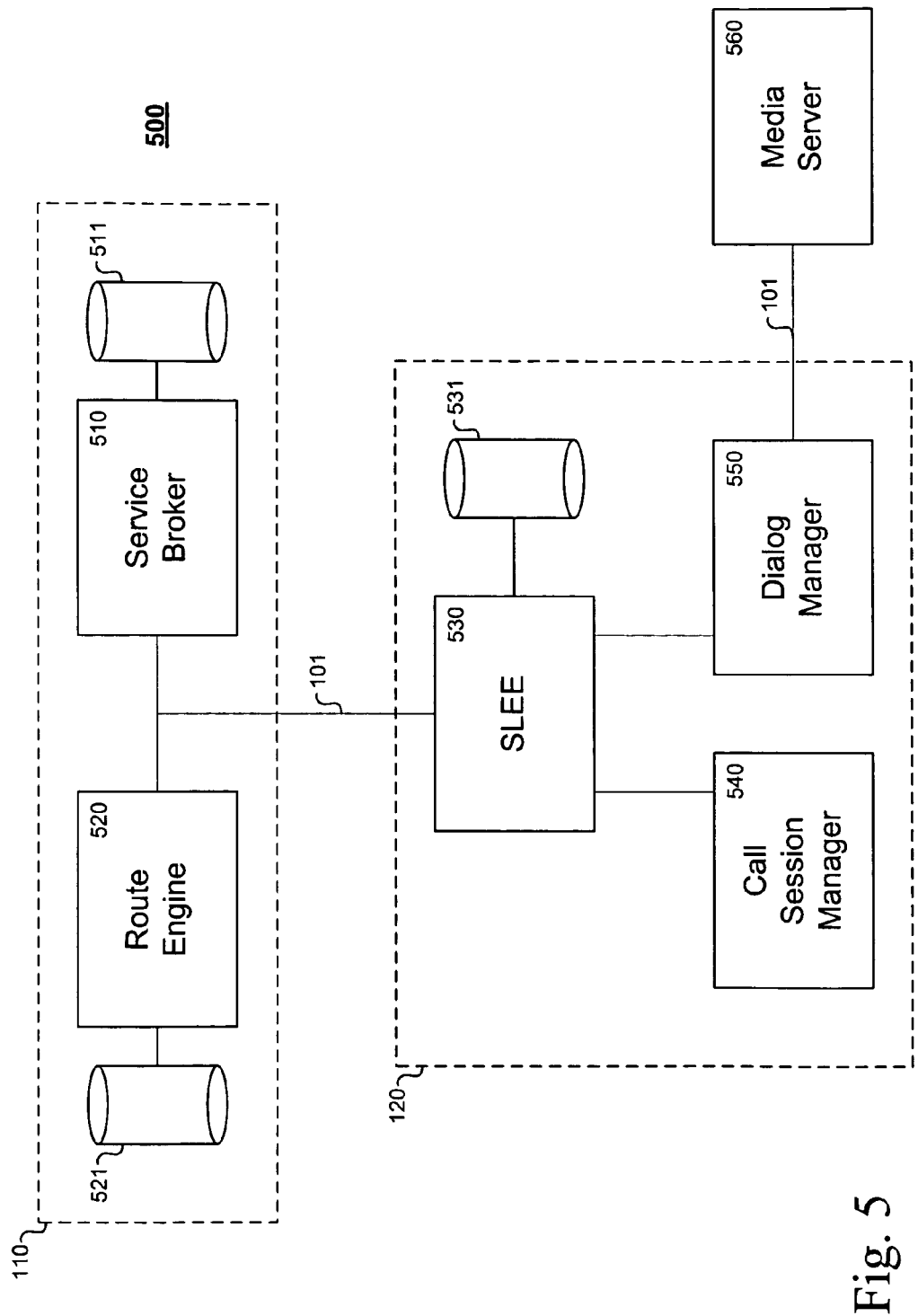
FIG. 5 is a block diagram showing the components of network devices related to provisioning and executing telephony services.

FIG. 5 is a block diagram 500 showing the sub-components of network devices illustrated in the exemplary network 100 of FIG. 1. The central node 110 includes a service broker 510, which is adapted to handle service requests from the local nodes 120, 130, or 140 for, e.g., distributing telephony services provisioned in a services database 511. The services database 511 can also include subscriber data used, for example, in determining the appropriate telephony service for a user and/or in generating an executable portion of the telephony service using a template telephony service. The central node 110 also includes a route engine 520, which is adapted to handle routing requests from the local nodes 120, 130, or 140. Routing data can be provisioned in a routing database 521. Routing data can be based on telephone numbers, email addresses, domain names, and/or IP addresses. Routing data can be transferred from the database 521 and copied to a local database 531 at the local node 120 such that communication with the central node 110 for routing information is not required by the local node 120 to make a call. Any changes to the routing data stored in the routing database 521 can be transmitted to the local nodes 120, 130, or 140 as necessary, e.g., at predetermined time intervals or whenever a change to the routing data is made. In this embodiment, the service broker 510 and the routing engine 520 are both located at the central node 110, but other configurations can also be used, e.g., the service broker 510 can be located at a different node than where the routing engine 520 is located. The local node 120 includes a service logic execution engine (SLEE) 530. The SLEE 530 is adapted to receive telephony services from the service broker 510 and locally store the received telephony services in a local database 531. The local database can also be adapted to store routing information and/or subscriber data received from the central node 110. The SLEE 530 is adapted to execute the telephony services. The local node 120 can also include a call session manager (CSM) 540. The CSM 540 manages the individual call sessions participating in the telephony service by maintaining call-state information. A telephony service can have one or more sessions participating in a call at any point in time. The local node 120 can also include a dialog manager (DM) 550. The DM 550 handles dialog requests that can be included in telephony services executed by the SLEE 530. The DM 550 determines a media server 560 on which the dialog can be executed. In this embodiment, the media server 560 is separate from the central node 110, but other configurations can also be used, e.g., the media server 560 can be located at the same node as either the service broker 510 or the routing engine 520.

Figure 6:
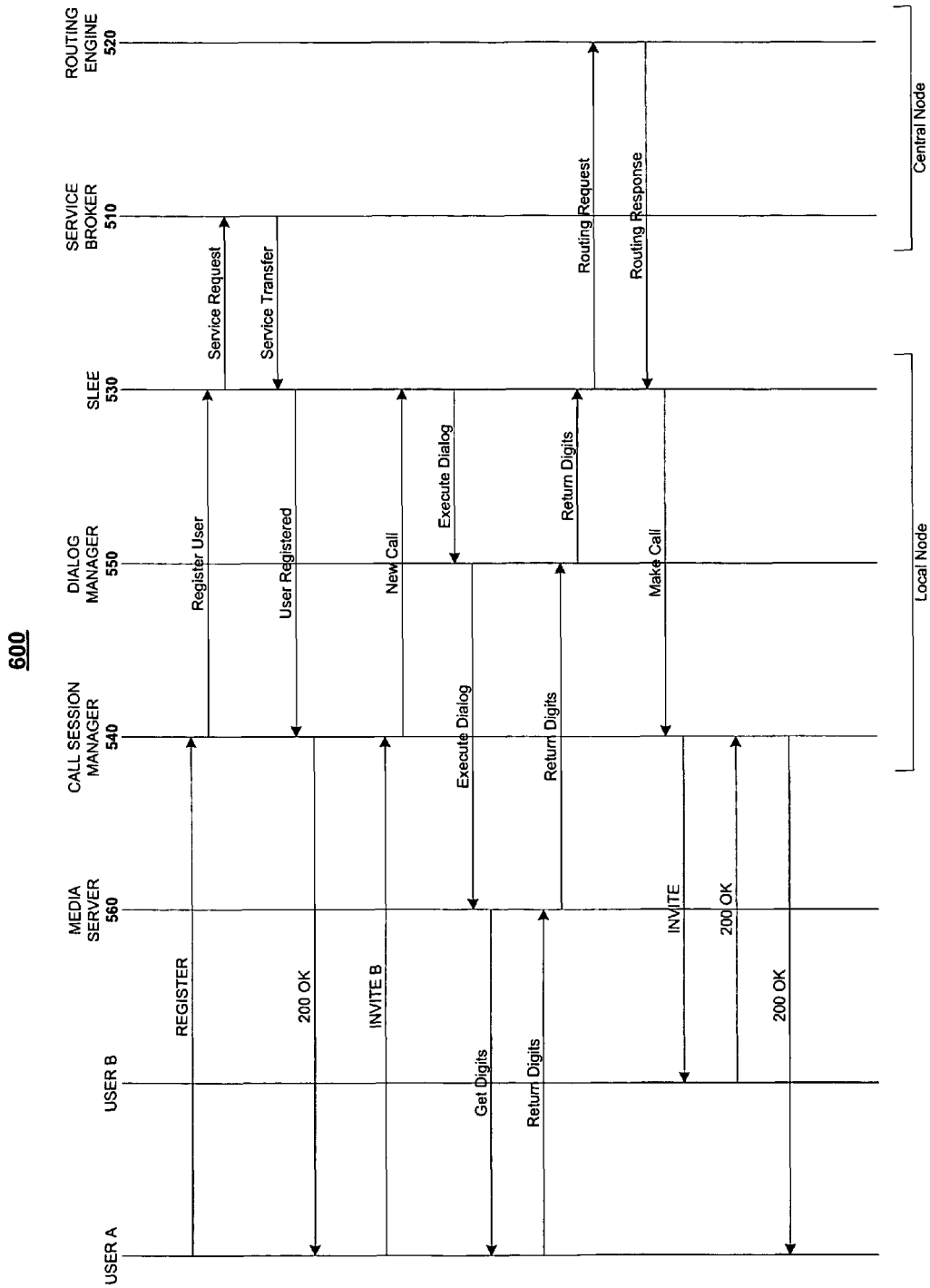
FIG. 6 illustrates another call flow diagram depicting the provisioning and execution of a telephony service when a user makes a call.

FIG. 6 illustrates a call flow 600 for setting up a call between two users, wherein the telephony service is transferred to the local node 120 prior to a call. The elements of the call flow 600 are described using the exemplary network devices of diagram 500 of FIG. 5. The ladder diagram begins when User A sends a register message to the local node 120, which is received by the CSM 540. The CSM 540 creates a session for this call. The CSM 540 passes the call to the SLEE 530, which determines if the telephony service associated with the call and/or User A is available on the local database 531. If the telephony service is not available, or if the telephony service is out-of-date, the SLEE 530 sends a service request message to the service broker 510 for retrieving the telephony service. Based on subscriber information, which can be associated with User A or a group of users to which User A belongs, the service broker 510 retrieves the appropriate telephony service provisioned at the central database 511. The service broker 510 transfers the telephony service to the SLEE 530, which can store the telephony service in the local database 531 for future retrieval. The SLEE 530 indicates to the CSM 540 that the registration was successful. The CSM 540 sends a message to User A indicating that the registration was successful. The registration call can be terminated at this point, or if additional services are requested by User A, they can be performed. To initiate a call to User B, User A sends an INVITE message to the local node 120, which is received by the CSM 540. The CSM 540 creates a session for this call and passes the call to the SLEE 530. The SLEE 530 determines and retrieves the telephony service to execute for the call from the local database 531. The SLEE 530 executes the telephony service. If the telephony service includes a dialog request, the SLEE 530 sends a dialog request message to the DM 550 to execute a dialog. The dialog request message can include a parameter that specifies the media server being invoked. The DM 550 calls the media server 560 with a request to execute a dialog. The dialog, for example, can require the media server 560 to contact User A and request information, e.g., the phone number of User B. The media server 560 returns the requested dialog information to the DM 550, which, in turn, passes the information on to the SLEE 530. In this example, the telephony service controls the call setup with User B, which can require retrieving routing information associated with User B. If the local database 531 does not contain the routing information associated with User B, the SLEE 530 requests the routing information from the route engine 520. The route engine 520 retrieves the requesting routing information from the database 521 and transmits it to the SLEE 530. Using the retrieved routing information, the SLEE 530 sends a message to the CSM 540 to make a call to User B. The CSM 540 sends an INVITE message to User B. User B can respond to the CSM 540 to indicate successful receipt of the INVITE message. The CSM 540 sends a message to User A indicating successful receipt by User B of the INVITE message and that the communication with User B can commence.

Figure 7:
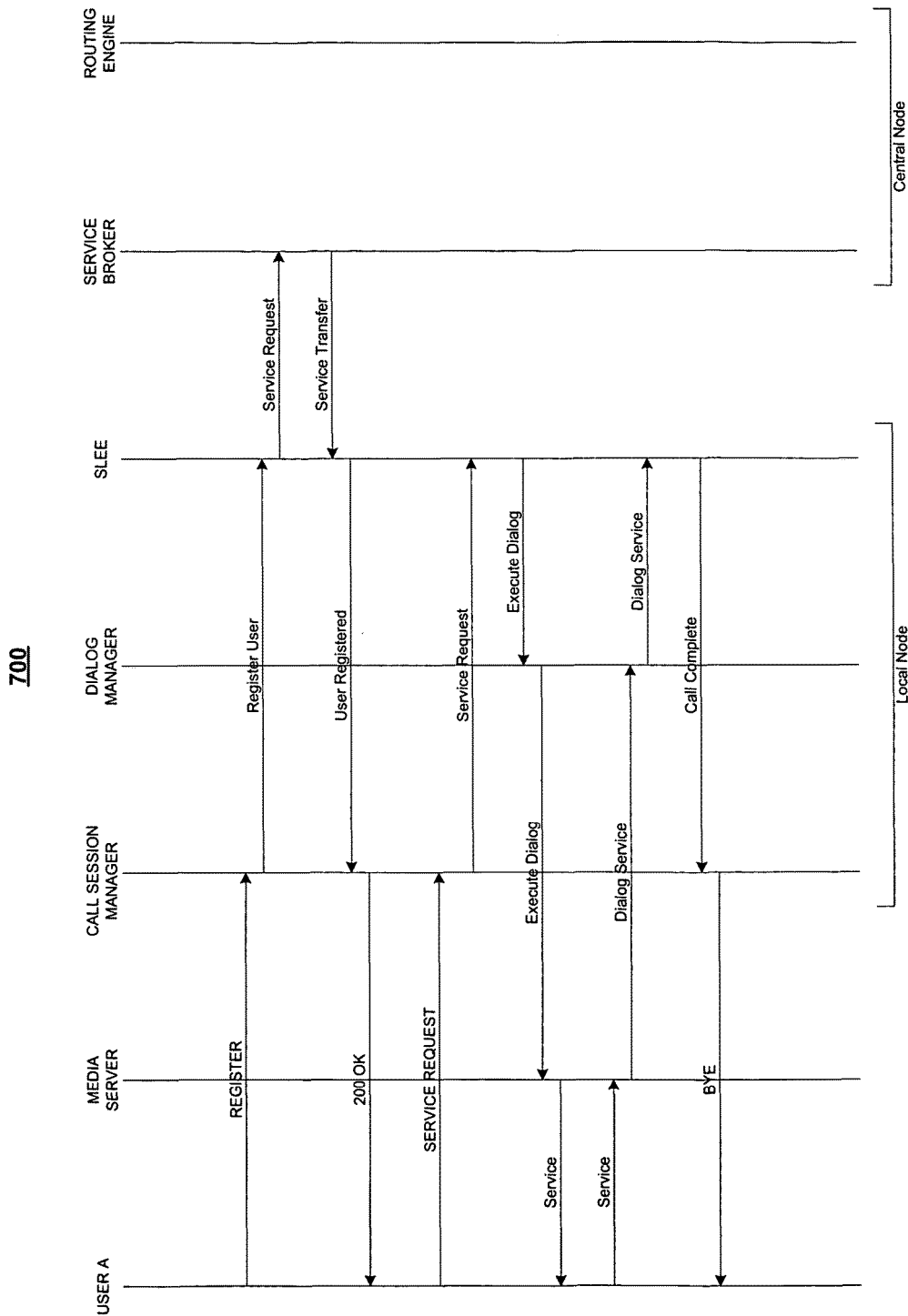
FIG. 7 illustrates another call flow diagram depicting the provisioning and execution of a telephony service when a user makes a call.

FIG. 7 illustrates a call flow 700 for setting up a call between a user and the local node 120, wherein the telephony service is transferred to the local node 120 prior to a call. The elements of the call flow 700 are described using the exemplary network devices of diagram 500 of FIG. 5. The ladder diagram begins when User A sends a register message to the local node 120, which is received by the CSM 540. The CSM 540 creates a session for this call. The CSM 540 passes the call to the SLEE 530, which determines if the telephony service associated with the call and/or User A is available on the local database 531. If the telephony service is not available, or if the telephony service is out-of-date, the SLEE 530 sends a service request message to the service broker 510 for retrieving the telephony service. Based on subscriber information, which can be associated with User A or a group of users to which User A belongs, the service broker 510 retrieves the appropriate telephony service provisioned at the central database 511. The service broker 510 transfers the telephony service to the SLEE 530, which can store the telephony service in the local database 531 for future retrieval. The SLEE 530 indicates to the CSM 540 that the registration was successful. The CSM 540 sends a message to User A indicating that the registration was successful. The registration call can be terminated at this point, or if additional services are requested by User A they can be performed. To initiate a call to the local node 120 to access telephony services, User A sends an INVITE message to the local node 120, which is received by the CSM 540. In this example, telephony services can include providing access to locally stored information, e.g., personal address books, departmental directories, and/or the like. The CSM 540 creates a session for this call and passes the call to the SLEE 530. The SLEE 530 determines and retrieves the telephony service to execute for the call from the local database 531. The SLEE 530 executes the telephony service. If the telephony service includes a dialog request, the SLEE 530 sends a dialog request message to the DM 550 to execute a dialog. The dialog request message can include a parameter that specifies the media server being invoked. The DM 550 calls the media server 560 with a request to execute a dialog. The dialog, for example, can require the media server 560 to contact User A and request information, e.g., the name of a user for which information is being requested. The media server 560 returns the requested dialog information to the DM 550, which, in turn, passes the information on to the SLEE 530. User A can perform additional telephony functions or complete the call upon retrieval of the originally requested information. The SLEE 530 instructs the CSM 540 to end the call. The CSM 540 terminates the call session and sends a BYE message to User A indicating the termination of the call.

As described above, telephony services can include an executable portion and/or a template portion. An exemplary telephony service is a personal dialing plan that includes group dialing information. One of the features of the personal dialing plan is that it includes phone numbers of individuals that are associated into a particular group. That group is given a group number (e.g., 123*). To make a phone call to that particular group, the user simply has to dial the group number (e.g., 123*). Upon execution, the telephony service automatically calls all of the individual telephone numbers in that particular group and conferences them together for a phone call. This can be accomplished, for example, by using a CCXML script for automatically calling the individual numbers and conferencing them together. In such an example, the script is the executable portion that is executed by the local node to perform the desired service. This conveniently eliminates the need of the user to dial each number himself and conference the called parties together. To create this telephony service, the user defines the individuals and their numbers for each of the groups. Based on the names and numbers, a creation tool can generate the necessary telephony service (e.g., a CCXML script), which is stored centrally. Then, as the user moves from one local node to another, the telephony service (or the executable portion thereof) can be loaded to that local node servicing the user. The user advantageously always can have access and use his/her personal dialing plan because the plan, with its stored groups, is transmitted and executed at the local node servicing that user.

A template can also be used to generate the above-described exemplary telephony service. For such a personal dialing plan, the template can include a baseline CCXML script for automatically calling individual numbers, but leave as a template variable the individual numbers of the group. The executable telephony service corresponding to the above personal dialing plan can be generated when the individual telephone numbers for a particular group are inserted into the script to replace the template variable(s). Once there is a template, the creation of a service for a particular individual can then be an automated process. For example, an application can provide verbal instruction, e.g., via a phone, prompting the caller for a name and number for an individual in the caller's group. As the application receives input from the caller, the application inserts that received input data into the script to replace the template variable(s).

Below is a sample CCXML (Call Control XML) script that illustrates an exemplary telephony service in which a list of phone numbers is stored and called, with the telephony service playing a prerecorded message each time the service calls an individual. This telephony service has a list of phone numbers (in this case SIP addresses—"user1 . . . ", "user2 . . . ", and "user3 . . . "). The CCXML script sequentially calls out to each of the SIP addresses and plays a prompt when the outbound call is answered. When the prompt is finished playing to one callee, the next callee is called, until the end of the list is reached. One exemplary use of this telephony service is where a soccer coach, for example, records a message (not shown or included as part of this example) for each of his soccer team members, and then invokes this telephony service to call each team member and play the message to them.

e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and the computer program can be deployed in any form, including as a stand-alone program or as a subroutine, element, or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by, and an apparatus can be implemented as, special purpose logic circuitry, e.g., an FPGA (field programmable gate array) or an ASIC (application-specific integrated circuit). Subroutines can refer to portions of the computer program and/or the processor/special circuitry that implements that functionality.

```
<?xml version="1.0" encoding="UTF-8" ?>
<ccxml version="1.0">
    <var name="numbers" expr="new
        Array('user1@10.1.1.42','user2@10.1.1.42','user3@10.1.1.42')"/>
    <var name="dialogPromptURL" expr="'http://server.test.com/blast/playPrompt.do'" />
    <var name="egress_conn_id" expr="''" />
    <var name="loopcount" expr="0" />
    <var name="currentstate" expr="'Start'" />
    <eventprocessor statevariable="currentstate">
        <transition state="Start" event="ccxml.loaded" name="evt">
            <assign name="currentstate" expr="'MakeCall'" />
            <createcall dest="numbers[loopcount]" connectionid="egress_conn_id" />
        </transition>
        <transition state="LoopTest" event="LoopTest.repeat" name="evt">
    <assign name="currentstate" expr="'MakeCall'" />
    <createcall dest="numbers[loopcount]" connectionid="egress_conn_id" />
</transition>
<transition state="MakeCall" event="connection.connected" name="evt">
    <assign name="currentstate" expr="'BlastPrompt'" />
    <assign name="egress_conn_id" expr="evt.connectionid" />
    <dialogstart connectionid="egress_conn_id" src="dialogPromptURL" />
</transition>
<transition state="BlastPrompt" event="dialog.exit" name="evt">
    <assign name="currentstate" expr="'LoopNext'" />
    <assign name="loopcount" expr="loopcount+1" />
    <send target="session.id" targettype="'ccxml'" data="'LoopNext.next'" />
</transition>
<transition state="LoopNext" event="LoopNext.next" name="evt">
    <assign name="currentstate" expr="'LoopTest'" />
    <var name="eventdata" />
    <if cond="loopcount < numbers.length">
        <assign name="eventdata" expr="'LoopTest.repeat'" />
        <else />
        <assign name="eventdata" expr="'LoopTest.done'" />
    </if>
    <send target="session.id" targettype="'ccxml'" data="eventdata" />
</transition>
<transition state="LoopTest" event="LoopTest.done" name="evt">
    <assign name="currentstate" expr="'Finished'" />
        <exit />
        </transition>
        <transition event="error.*" name="evt">
            <log expr="'Unhandled error event: ' + evt.error" />
            <exit />
        </transition>
    </eventprocessor>
</ccxml>
```

The above-described techniques can be implemented in digital electronic circuitry, or in computer hardware, firmware, software, or in combinations of them. The implementation can be as a computer program product, i.e., a computer program tangibly embodied in an information carrier, Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and a server are generally remote from each other and typically interact through a communication network. The relationship of client and server arises by virtue of computer programs running on the respective computers and having a client-server relationship to each other.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computer-implemented method comprising:
   generating a telephony service at a service creation environment (SCE) connected to a central node;
   provisioning said telephony service at said central node, said central node being coupled to a packet based network;
   transmitting over said packet based network at least a portion of the telephony service from the central node to a first local node comprising a services gateway coupled to said packet based network, said portion of the telephony service including a SIP address;
   executing at least an executable portion of the telephony service at the first local node, the executable portion of the telephony service comprising a set of call session control instructions;
   associating a user with the first local node, the first local node being in communication with a telephony device of the user;
   associating the user with a second local node different from the first local node;
   transmitting the telephony service to the second local node over said packet based network;
   executing the telephony service at the second local node; and
   wherein associating the user with the second local node is in response to the user registering the telephony device with the second local node.

2. The method of claim 1, wherein the central node comprises a central server, said method further comprising:
   receiving a SIP signal at said central server from said services gateway; and
   transmitting said at least a portion of the telephony service to said services gateway in response to receiving said SIP signal.

3. The method of claim 1, wherein the packet based network is the Internet and said telephony service includes dialog control for voice interaction between a user and a database and provides said user access to a remote database to retrieve and update information included in two or more of the following: a personal address book, a personal dialing plan, and a contact list.

4. The method of claim 1, wherein the set of call session control instructions includes instructions for maintaining call-state information.

5. The method of claim 1, wherein the set of call session control instructions conforms to a CCXML standard.

6. The method of claim 1, wherein the set of call session control instructions supports a voice telephony service based on: VXML, MSCML, MSML, MOML, IVR, or any combination thereof.

7. The method of claim 1, wherein the telephony device includes an IP phone.

8. The method of claim 1 further comprising:
   storing, at the central node, the telephony service, the telephony service including a telephony service template; and
   generating the at least an executable portion of the telephony service using the telephony service template.

9. The method of claim 8, wherein the at least a portion of the telephony service includes the telephony service template.

10. The method of claim 8, wherein the at least a portion of the telephony service includes the at least an executable portion of the telephony service.

11. The method of claim 1, wherein associating the user with the first local node is in response to the telephony device of the user connecting with a local network coupled to the first local node.

12. The method of claim 1, wherein associating the user with the first local node is in response to the user registering the telephony device with the first local node.

13. The method of claim 1, wherein transmitting the at least a portion of the telephony service to the first local node is in response to associating the user with the first local node.

14. The method of claim 1, wherein transmitting the at least one portion of the telephony service to the first local node is in response to a call associated with the user.

15. The method of claim 1, further comprising:
provisioning routing information at the central node;
copying the routing information to the first local node; and
routing calls at the first local node using the copied routing information.

16. The method of claim 1 wherein said call session control instructions include control instructions for an entire call session.

17. The method of claim 1 wherein said call session control instructions include instructions for controlling the maintenance of a call between a device initiating the call and a device receiving the call.

18. A computer-implemented method comprising:
generating a telephony service at a service creation environment (SCE) connected to a central node;
provisioning said telephony service at said central node, said central node being coupled to a packet based network;
transmitting over said packet based network at least a portion of the telephony service from the central node to a first local node comprising a services gateway coupled to said packet based network, said portion of the telephony service including a SIP address;
executing at least an executable portion of the telephony service at the first local node, the executable portion of the telephony service comprising a set of call session control instructions;
associating a user with the first local node, the first local node being in communication with a telephony device of the user;
associating the user with a second local node different from the first local node;
transmitting the telephony service to the second local node over said packet based network;
executing the telephony service at the second local node; and wherein associating the user with the second local node is in response to the telephony device of the user connecting with a local network coupled to the second local node, said local network coupled to the second local node being a Private Branch eXchange network.

19. A system comprising:
a service creation environment (SCE) connected to a central node, said service creation environment generating a telephony service;
said central node provisioning said telephony service, said central node being coupled to a packet based network and transmitting over said packet based network at least a portion of the telephony service to a first local node comprising a services gateway coupled to said packet based network, said portion of the telephony service including a SIP address;
wherein said first local node executes at least an executable portion of the telephony service, the executable portion of the telephony service comprising a set of call session control instructions, a user being associated with the first local node, the first local node being in communication with a telephony device of the user, the user also being associated with a second local node in response to the user registering the telephony device with the second local node, said second local node being different from the first local node; and
wherein the central node transmits the telephony service to the second local node over said packet based network and second local node executes the telephony service.

20. The system of claim 19,
wherein the central node comprises a central server; and
wherein said central server receives a SIP signal from said services gateway; and transmits said at least a portion of the telephony service to said services gateway in response to receiving said SIP signal.

21. The system of claim 19, wherein the packet based network is the Internet and said telephony service includes dialog control for voice interaction between a user and a database and provides said user access to a remote database to retrieve and update information included in two or more of the following: a personal address book, a personal dialing plan, and a contact list.

22. The system of claim 19 wherein the first local node includes a service logic execution engine adapted to execute the executable portion of the telephony service.

23. The system of claim 19 wherein the first local node includes a call session manager, and the set of call session control instructions include instructions for maintaining call-state information on the call session manager.

24. The system of claim 19 further comprising:
the central node storing the telephony service, the telephony service including a telephony service template; and
the central node generating the at least an executable portion of the telephony service using the telephony service template.

25. The system of claim 24, wherein the at least a portion of the telephony service includes the telephony service template.

26. The system of claim 19, wherein the central node transmits the telephony service to the first local node in response to the user being associated with the first local node.

27. The system of claim 19,
wherein the central node provisions routing information and copies the routing information to the first local node; and
wherein the first local node routes calls using the copied routing information.

28. A system comprising:
a service creation environment (SCE) connected to a central node, said service creation environment generating a telephony service;
said central node provisioning said telephony service, said central node being coupled to a packet based network and transmitting over said packet based network at least a portion of the telephony service to a first local node comprising a services gateway coupled to said packet based network, said portion of the telephony service including a SIP address;
wherein said first local node executes at least an executable portion of the telephony service, the executable portion of the telephony service comprising a set of call session control instructions, a user being associated with the first local node, the first local node being in communication with a telephony device of the user, the user also being associated with a second local, said second local node being different from the first local node;

wherein the central node transmits the telephony service to the second local node over said packet based network and second local node executes the telephony service;

and wherein the user is associated with the second local node in response to the telephony device of the user connecting with a local network coupled to the second local node, said local network coupled to the second local node being a Private Branch eXchange network.

* * * * *